(12) United States Patent
Wang et al.

(10) Patent No.: US 11,502,344 B2
(45) Date of Patent: Nov. 15, 2022

(54) HYDROMETALLURGICAL METHOD FOR RECYCLING LEAD FROM SPENT LEAD-ACID BATTERY PASTE

(71) Applicant: University of Science and Technology Beijing, Beijing (CN)

(72) Inventors: Chengyan Wang, Beijing (CN); Peng Xing, Beijing (CN); Yongqiang Chen, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 498 days.

(21) Appl. No.: 16/499,374

(22) PCT Filed: Oct. 17, 2017

(86) PCT No.: PCT/CN2017/106567
§ 371 (c)(1),
(2) Date: Sep. 30, 2019

(87) PCT Pub. No.: WO2019/071642
PCT Pub. Date: Apr. 18, 2019

(65) Prior Publication Data
US 2020/0280111 A1    Sep. 3, 2020

(30) Foreign Application Priority Data

Oct. 11, 2017 (CN) .......................... 201710941341.2

(51) Int. Cl.
*H01M 10/54* (2006.01)
*C22B 7/00* (2006.01)
*C22B 3/00* (2006.01)

(52) U.S. Cl.
CPC ............. *H01M 10/54* (2013.01); *C22B 7/007* (2013.01); *C22B 13/045* (2013.01)

(58) Field of Classification Search
CPC ....... C22B 13/00; C22B 13/04; C22B 13/045; C22B 1/11; C22B 1/00; C22B 3/00;
(Continued)

(56) References Cited

U.S. PATENT DOCUMENTS

| 4,096,045 A * | 6/1978 | Ahonen ................ C22B 13/045 423/94 |
| 4,634,507 A * | 1/1987 | Nogueira ............... C01G 9/003 423/100 |
| 2004/0115108 A1* | 6/2004 | Hackl ....................... C22B 3/44 423/22 |

FOREIGN PATENT DOCUMENTS

| CN | 101157987 A | 4/2008 |
| CN | 101289706 A | 10/2008 |

(Continued)

OTHER PUBLICATIONS

I Roitto, H Lehto, A Pazand M Åstholm, Stirred Milling Technology—A New Concept in Fine Grinding, Jul. 15-17, 2013, Metallurgical Plant Design and Operating Strategies (Year: 2013).*

(Continued)

*Primary Examiner* — Vanessa T. Luk
*Assistant Examiner* — Nikolas Takuya Pullen
(74) *Attorney, Agent, or Firm* — Bayramoglu Law Offices LLC

(57) ABSTRACT

A method for recycling lead from spent lead-acid battery paste, relating to the technical field of hydrometallurgy. In the method, firstly a reducing agent, and a lead paste are added into a zinc chloride solution for leaching in a stirring mill to cause lead in the lead paste to enter the solution, a lead cementation is performed by using zinc in the leached solution, after the lead cementation, the electrolytic zinc is produced by controlling an electrodeposition on the zinc chloride solution for a short time, the reducing agent is zinc, lead or hydrogen peroxide, a part of the electrolytic zinc is (Continued)

returned as the reducing agent for leaching, the step of returning the electrolytic zinc as the reducing agent can be omitted when the lead or the hydrogen peroxide is used as the reducing agent.

14 Claims, 1 Drawing Sheet

(58) Field of Classification Search
CPC .. C22B 3/04; C22B 3/045; C22B 3/06; C22B 3/10; C22B 3/44; C22B 3/46; C22B 7/00; C22B 7/006; C22B 7/007
See application file for complete search history.

(56) References Cited

FOREIGN PATENT DOCUMENTS

| CN | 103757420 A | * | 4/2014 | |
|----|-------------|---|--------|---|
| CN | 104357668 A | | 2/2015 | |
| CN | 105907974 A | | 8/2016 | |
| CN | 106086414 A | | 11/2016 | |
| CN | 106995886 A | | 8/2017 | |
| GB | 2128597 A | * | 5/1984 | ............. C22B 11/04 |
| WO | 2015195454 A1 | | 12/2015 | |

OTHER PUBLICATIONS

Zinc Chloride Safety Data Sheet, Sigma Aldrich, Aug. 4, 2021, p. 9 (Year: 2021).*
Calcium Chloride Safety Data Sheet, Sigma Aldrich, Apr. 20, 2021, p. 9 (Year: 2021).*
Standard Reduction Potentials, 2008, Pearson Prentice Hall (Year: 2008).*
He et al., CN 101289706 A Machine Translation, Oct. 2008 (Year: 2008).*
Xing et al., CN 105907974 A Machine Translation, Aug. 2016 (Year: 2016).*
Oxidizing and Reducing Agents, Mar. 21, 2006, Bodner Research Web (Year: 2006).*
Method 1314: Luliquid-Solid Partitioning as a Function of Liquid-Solid Ratio for Constituents in Solid Materials Using an Up-Flow Percolation Column Procedure, Jan. 2013, EPA, pp. 1-26. USA.

* cited by examiner

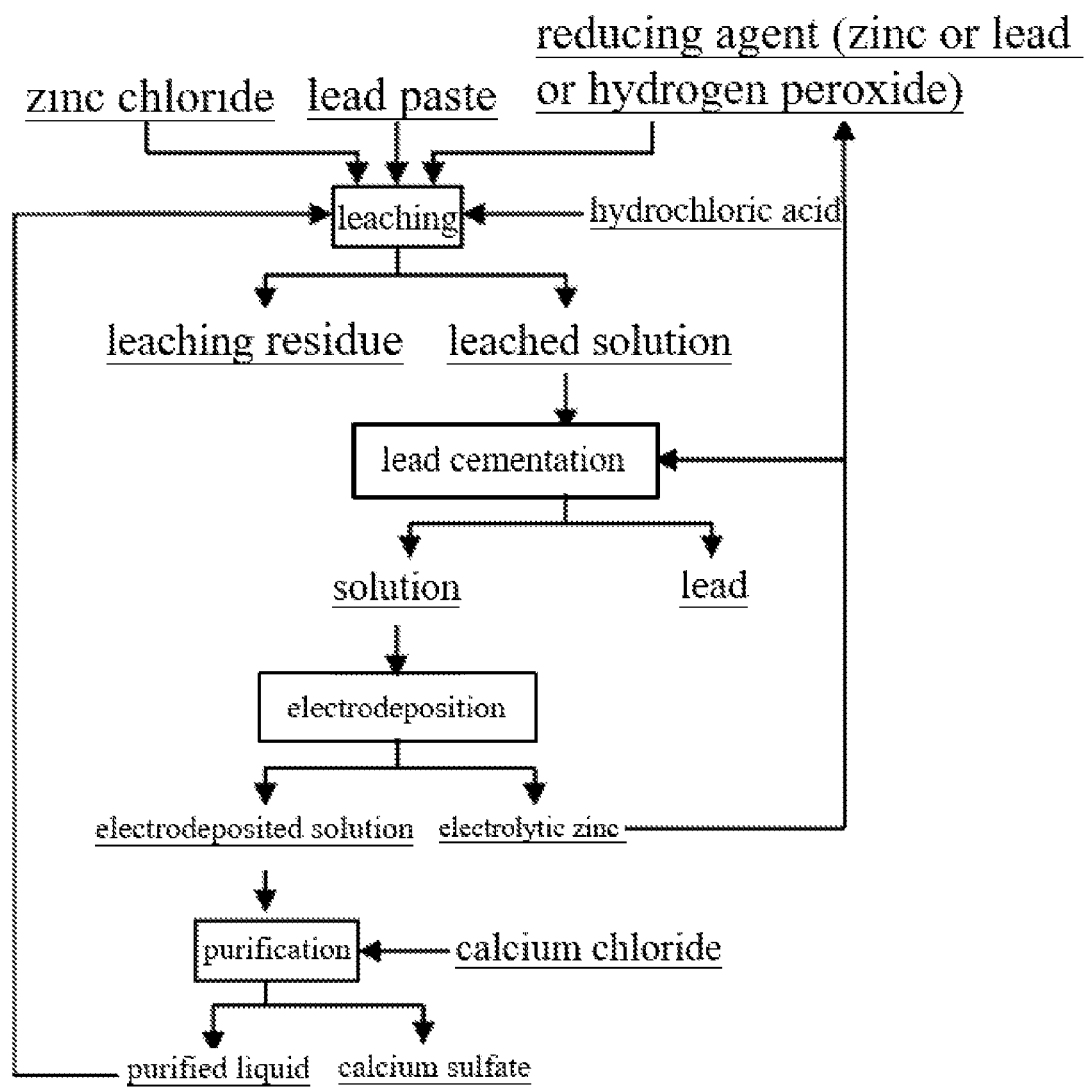

HYDROMETALLURGICAL METHOD FOR RECYCLING LEAD FROM SPENT LEAD-ACID BATTERY PASTE

CROSS REFERENCE TO THE RELATED APPLICATIONS

This application is the national phase entry of International Application No. PCT/CN2017/106567, filed on Oct. 17, 2017, which is based upon and claims priority to Chinese Patent Application No. 201710941341.2, filed on Oct. 11, 2017, the entire contents of which are incorporated herein by reference.

TECHNICAL FIELD

The present disclosure relates to the technical field of hydrometallurgy, particularly to a method for recycling lead from spent lead-acid battery paste.

BACKGROUND

In the consumption structure of lead, the lead consumption in lead-acid batteries accounts for about 85% of the total lead consumption. China produces about one third of the world's lead batteries. More than 1.5 million tons of batteries are discarded every year, and the discarded batteries have become a huge renewable lead resource.

The spent lead-acid batteries are usually crushed and sorted to obtain lead grids, organic waste plastics and lead paste. The recycling of the lead grids and the organic waste plastics is relatively simple, while the composition of the lead paste is complex, therefore the recycling is hard.

At present, the desulfurizer is commonly used to first convert $PbSO_4$ in the lead paste into $Pb_2CO_3$ in the pyrometallurgical process for treating the lead paste, the converted $Pb_2CO_3$ can be smelted at a relatively low temperature. Due to an incomplete conversion, about 5% of $PbSO_4$ may remain in the converted lead paste, and $SO_2$ is produced during smelting. The pyrometallurgical process of treating lead paste not only consumes high energy and a large amount of desulfurizer, but also produces atmospheric pollutants such as $SO_2$, volatile lead dust, and leads to high costs of treating smelting flue gas.

SUMMARY

The technical problem to be solved by the present disclosure is to provide a method for recycling lead from spent lead-acid battery paste, realizing a direct extraction of a high content of lead from the lead paste.

An object to be processed by the method is the spent lead-acid battery paste, and the method specifically includes the following steps:

(1) leaching a lead paste by using zinc, lead or hydrogen peroxide as a reducing agent, and a zinc chloride solution as a leaching agent, after the leaching is completed, obtaining a leaching residue and a leached solution by a solid-liquid separation;

(2) adding zinc to the leached solution obtained in the step (1) for a lead cementation to obtain the lead and a solution;

(3) performing an electrodeposition on the solution obtained in the step (2) for a short time to obtain electrolytic zinc and an electrodeposited solution;

(4) using a part of the electrolytic zinc obtained in the step (3) as the reducing agent to return back to the step (1) for leaching (this step may be omitted when the lead or the hydrogen peroxide is used as the reducing agent), and using the remaining electrolytic zinc as a cementation reagent to return to the step (2) for the lead cementation;

(5) adding calcium chloride to the electrodeposited solution obtained in the step (3) to remove a sulfate ion in the solution and obtain calcium sulfate and a purified solution;

(6) using the purified solution obtained in the step (5) as the leaching agent to return to the step (1) again.

Where, the lead paste treated in the step (1) contains 60% to 75% of Pb; a leaching temperature in the step (1) is 20° C. to 95° C., a leaching time is 0.5 h to 4 h, and a concentration of the zinc chloride solution is 100 g/L to 600 g/L, before leaching, a liquid-solid ratio in the mixed solution consisting of the lead paste, the zinc chloride solution and the reducing agent is 20-40:1, and the equipment used for the leaching is a stirring mill; hydrochloric acid is used to control a pH of the solution at 1.0 to 4.0 during the leaching process.

The zinc used in the step (2) is electrolytic zinc, a cementation temperature is 20° C. to 90° C., an amount of the zinc used is 1 to 1.1 times of a theoretical amount, and a cementation time is 0.5 h to 2 h.

The current density of the zinc electrodeposition in the step (3) is 100 A/m² to 500 A/m², a temperature is 10° C. to 60° C., an anode is graphite or a ruthenium-plated titanium plate, and a cathode is a titanium plate.

A reaction temperature in the step (5) is 10° C. to 60° C., and an amount of the calcium chloride used is 1 to 1.1 times of a theoretical amount.

The advantages of the above technical solution of the present disclosure are as follows:

Compared with pyrometallurgical methods, the method of the present disclosure has low energy consumption and can meet the environmental requirements for clean production. The zinc chloride leaching agent can be recycled, and the zinc consumed in the leaching and cementation process enters the solution and is recycled by electrodeposition, the lead extraction process consumes only a small amount of calcium chloride, and the reagent consumption is small. In addition to directly obtain the high content of lead, the sulfate ions entering the solution after leaching can be crystallized in the form of calcium sulfate, and the calcium sulfate can be used as building materials and additives.

BRIEF DESCRIPTION OF THE DRAWINGS

FIGURE shows a process flow diagram of a hydrometallurgical method for recycling lead from spent lead-acid battery paste of the present disclosure.

DETAILED DESCRIPTION OF THE EMBODIMENTS

The technical problems, the technical solutions, and the advantages of the present disclosure will be more clearly described in the following description with the accompanying drawings and specific embodiments.

The present disclosure provides a hydrometallurgical method for recycling lead from spent lead-acid battery paste. FIGURE shows a process flow diagram of the method. The method specifically includes steps of leaching, lead cementation, zinc electrodeposition, solution purification, etc., which will be described in conjunction with the following specific embodiments.

Embodiment 1

Leaching: 100 g of lead paste (Pb 71.1%) is used, a leaching agent is a 500 g/L zinc chloride solution, an amount of the reducing agent used, i.e., electrolytic zinc (zinc content 99.5%), is 9 g, a leaching temperature is 80° C., a leaching time is 2 h, a liquid-solid ratio is 20:1, a leaching pH is 2.0, a leaching rate of lead reaches 98.2%.

Lead cementation: electrolytic zinc (zinc content 99.5%) is used as a cementation reagent, a cementation temperature is 25° C., an amount of zinc used is 1 time of a theoretical amount, a cementation time is 1 h, and a total of 69.9 g of lead mud is obtained, where the lead content is 99.7%.

Zinc electrodeposition: the ruthenium-plated titanium plate is used as the anode, the titanium plate is used as the cathode, the electrodeposition is performed for 2 h at a current density of 250 A/m$^2$ and a temperature of 25° C., the produced electrolytic zinc (zinc content 99.5%) is 31.5 g, and the current efficiency is 93.4%.

Purification of electrodeposited solution: at a temperature of 25° C., a theoretical amount of calcium chloride is added to the circulating zinc electrodeposited solution according to the concentration of sulfate ions to form a calcium sulfate precipitate, and the concentration of sulfate ions is controlled at 20 g/L in the solution.

Embodiment 2

Leaching: 100 g of lead paste (Pb 70.5%) is used, a leaching agent is a 500 g/L zinc chloride solution, an amount of a reducing agent used, i.e., lead (pure lead), is 26.5 g, a leaching temperature is 65° C., a leaching time is 2 h, a liquid-solid ratio is 22:1, a leaching pH is 2.5, a leaching rate of lead reaches 97.8%.

Lead cementation: the electrolytic zinc (zinc content 99.5%) is used as a cementation reagent, a cementation temperature is 30° C., an amount of zinc used is 1 time of a theoretical amount, a cementation time is 1 h, and a total of 69.1 g of lead mud is obtained, where the lead content is 99.5%.

Zinc electrodeposition: the ruthenium-plated titanium plate is used as the anode; the titanium plate is used as the cathode. The electrodeposition is performed for 1.6 h at a current density of 300 A/m$^2$ and a temperature of 25° C., the produced electrolytic zinc (zinc content 99.3%) is 30.2 g, and the current efficiency is 93.1%.

Purification of electrodeposited solution: at a temperature of 25° C., a theoretical amount of calcium chloride is added to the circulating zinc electrodeposited solution according to the concentration of sulfate ions to form a calcium sulfate precipitate, and the concentration of sulfate ions is controlled at 20 g/L in the solution.

Embodiment 3

Leaching: 10 g of lead paste (Pb 68.4%) is used, a leaching agent is a 400 g/L zinc chloride solution, an amount of a reducing agent used, i.e., hydrogen peroxide, is 3 mL, a leaching temperature is 80° C., a leaching time is 2 h, a liquid-solid ratio is 25:1, a leaching pH is 3.0, and a leaching rate of lead reaches 95.7%.

Lead cementation: the electrolytic zinc (zinc content 99.5%) is used as a cementation reagent, a cementation temperature is 30° C., an amount of zinc used is 1 time of a theoretical amount, a cementation time is 1 h, and a total of 6.6 g of lead mud is obtained, where the lead content is 99.4%.

Zinc electrodeposition: the graphite is used as the anode, the titanium plate is used as the cathode, the electrodeposition is performed for 0.5 h at a current density of 150 A/m$^2$ and a temperature of 30° C., the produced electrolytic zinc (zinc content 99.6%) is 2.1 g, and the current efficiency is 93.8%.

Purification of electrodeposited solution: at a temperature of 20° C., a theoretical amount of calcium chloride is added to the circulating zinc electrodeposited solution according to the concentration of sulfate ions to form a calcium sulfate precipitate, and the concentration of sulfate ions is controlled at 20 g/L in the solution.

The above description shows the preferred embodiments of the present disclosure. For a person having ordinary skill in the art, it should be noted that several improvements and refinements can also be made in the present disclosure without departing from the principles of the present disclosure, and these improvements and refinements should also be considered as falling within the protection scope of the present disclosure.

What is claimed is:

1. A hydrometallurgical method for recycling lead from a spent lead-acid battery, comprising the following steps:
   (1) leaching a lead paste from the spent lead-acid battery by using lead or hydrogen peroxide as a reducing agent, and a zinc chloride solution as a leaching agent; after the leaching is completed, obtaining a leaching residue and a leached solution by a liquid-solid separation;
   (2) adding zinc to the leached solution obtained in the step (1) for a lead cementation to obtain the lead and a solution;
   (3) performing an electrodeposition on the solution obtained in the step (2) to obtain an electrolytic zinc and an electrodeposited solution;
   (4) using the electrolytic zinc obtained in the step (3) as a cementation reagent in the step (2) for the lead cementation;
   (5) adding calcium chloride to the electrodeposited solution obtained in the step (3) to remove a sulfate ion in the solution and obtain calcium sulfate and a purified solution;
   (6) using the purified solution obtained in the step (5) as the leaching agent in the step (1).

2. The method for recycling the lead from the spent lead-acid battery paste according to claim 1, wherein the lead paste treated in the step (1) has a composition comprising 60% to 75% by weight of Pb.

3. The method for recycling the lead from the spent lead-acid battery paste according to claim 1, wherein in the step (1), a leaching temperature is 20° C. to 95° C., a leaching time is 0.5 h to 4 h, and a concentration of the zinc chloride solution is 100 to 600 g/L, before leaching, a liquid-solid ratio in a mixed solution consisting of the lead paste, the zinc chloride solution and the reducing agent is 20-40:1, and an equipment used for the leaching is a stirring mill.

4. The method for recycling the lead from the spent lead-acid battery paste according to claim 1, wherein in the step (1), hydrochloric acid is used to control a pH of the solution at 1.0 to 4.0 during the leaching process.

5. The method for recycling the lead from the spent lead-acid battery paste according to claim 1, wherein in the step (2), the zinc used is electrolytic zinc, a cementation temperature is 20° C. to 90° C., an amount of the zinc used is 1 to 1.1 times of a theoretical amount of the zinc to corresponding to an amount of lead to complete lead cementation, and a cementation time is 0.5 h to 2 h.

6. The method for recycling the lead from the spent lead-acid battery paste according to claim 1, wherein in a zinc electrodeposition in the step (3), a current density is 100

A/m² to 500 A/m², a temperature is 10° C. to 60° C., an anode is graphite or a ruthenium-plated titanium plate, and a cathode is a titanium plate.

7. The method for recycling the lead from the spent lead-acid battery paste according to claim 1, wherein in the step (5), a reaction temperature is 10° C. to 60° C., an amount of the calcium chloride used is 1 to 1.1 times of a theoretical amount of the calcium chloride corresponding to an amount of sulfate ion to complete a reaction for obtaining calcium sulfate, and a concentration of sulfate ions is controlled at 20 g/L.

8. A hydrometallurgical method for recycling lead from a spent lead-acid battery, comprising the following steps:
(1) leaching a lead paste from the spent lead-acid battery by using zinc as a reducing agent, and a zinc chloride solution as a leaching agent; after the leaching is completed, obtaining a leaching residue and a leached solution by a liquid-solid separation;
(2) adding zinc to the leached solution obtained in the step (1) for a lead cementation to obtain the lead and a solution;
(3) performing an electrodeposition on the solution obtained in the step (2) to obtain an electrolytic zinc and an electrodeposited solution;
(4) using a part of the electrolytic zinc obtained in the step (3) as the reducing agent in the step (1) for leaching, and using the remaining electrolytic zinc as a cementation reagent in the step (2) for the lead cementation;
(5) adding calcium chloride to the electrodeposited solution obtained in the step (3) to remove a sulfate ion in the solution and obtain calcium sulfate and a purified solution;
(6) using the purified solution obtained in the step (5) as the leaching agent in the step (1).

9. The method for recycling the lead from the spent lead-acid battery paste according to claim 8, wherein the lead paste treated in the step (1) has a composition comprising 60% to 75% by weight of Pb.

10. The method for recycling the lead from the spent lead-acid battery paste according to claim 8, wherein in the step (1), a leaching temperature is 20° C. to 95° C., a leaching time is 0.5 h to 4 h, and a concentration of the zinc chloride solution is 100 to 600 g/L, before leaching, a liquid-solid ratio in a mixed solution consisting of the lead paste, the zinc chloride solution and the reducing agent is 20-40:1, and an equipment used for the leaching is a stirring mill.

11. The method for recycling the lead from the spent lead-acid battery paste according to claim 8, wherein in the step (1), hydrochloric acid is used to control a pH of the solution at 1.0 to 4.0 during the leaching process.

12. The method for recycling the lead from the spent lead-acid battery paste according to claim 8, wherein in the step (2), the zinc used is electrolytic zinc, a cementation temperature is 20° C. to 90° C., an amount of the zinc used is 1 to 1.1 times of a theoretical amount of the zinc to corresponding to an amount of lead to complete lead cementation, and a cementation time is 0.5 h to 2 h.

13. The method for recycling the lead from the spent lead-acid battery paste according to claim 8, wherein in a zinc electrodeposition in the step (3), a current density is 100 A/m² to 500 A/m², a temperature is 10° C. to 60° C., an anode is graphite or a ruthenium-plated titanium plate, and a cathode is a titanium plate.

14. The method for recycling the lead from the spent lead-acid battery paste according to claim 8, wherein in the step (5), a reaction temperature is 10° C. to 60° C., an amount of the calcium chloride used is 1 to 1.1 times of a theoretical amount of the calcium chloride corresponding to an amount of sulfate ion to complete a reaction for obtaining calcium sulfate, and a concentration of sulfate ions is controlled at 20 g/L.

* * * * *